April 8, 1930.  H. G. NUTT  1,753,248
FRUIT VENDING APPARATUS
Filed Feb. 8, 1928   3 Sheets-Sheet 1

INVENTOR.
Harry G. Nutt
BY Arthur P. Knight and
Alfred W. Knight
ATTORNEYS

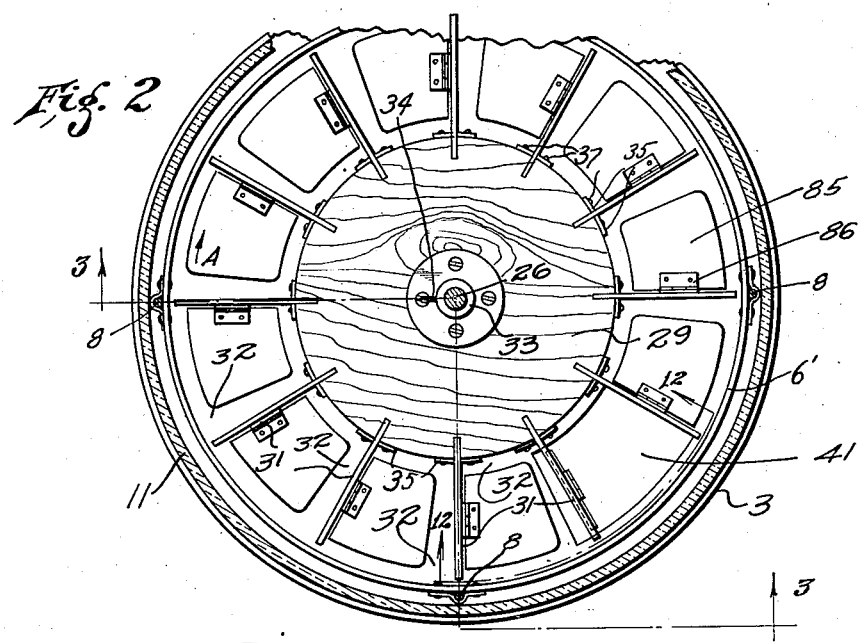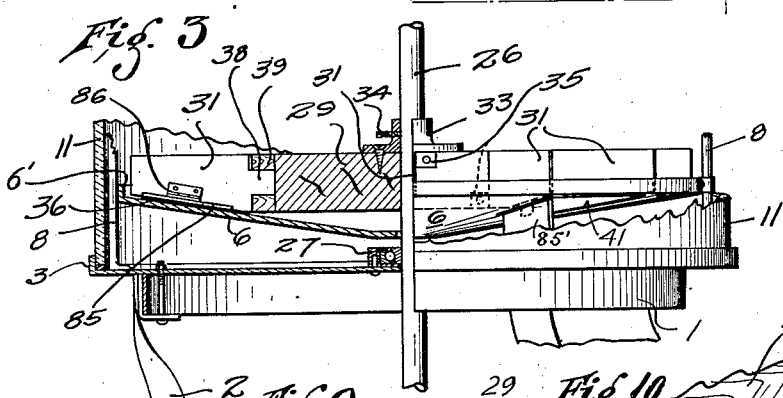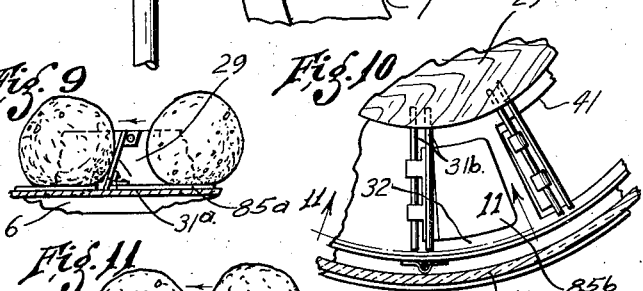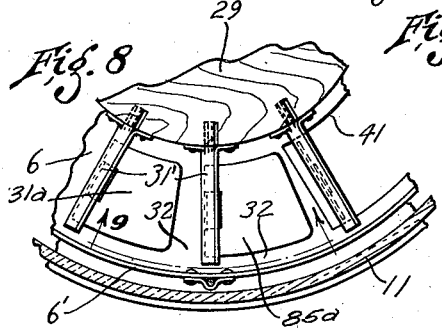

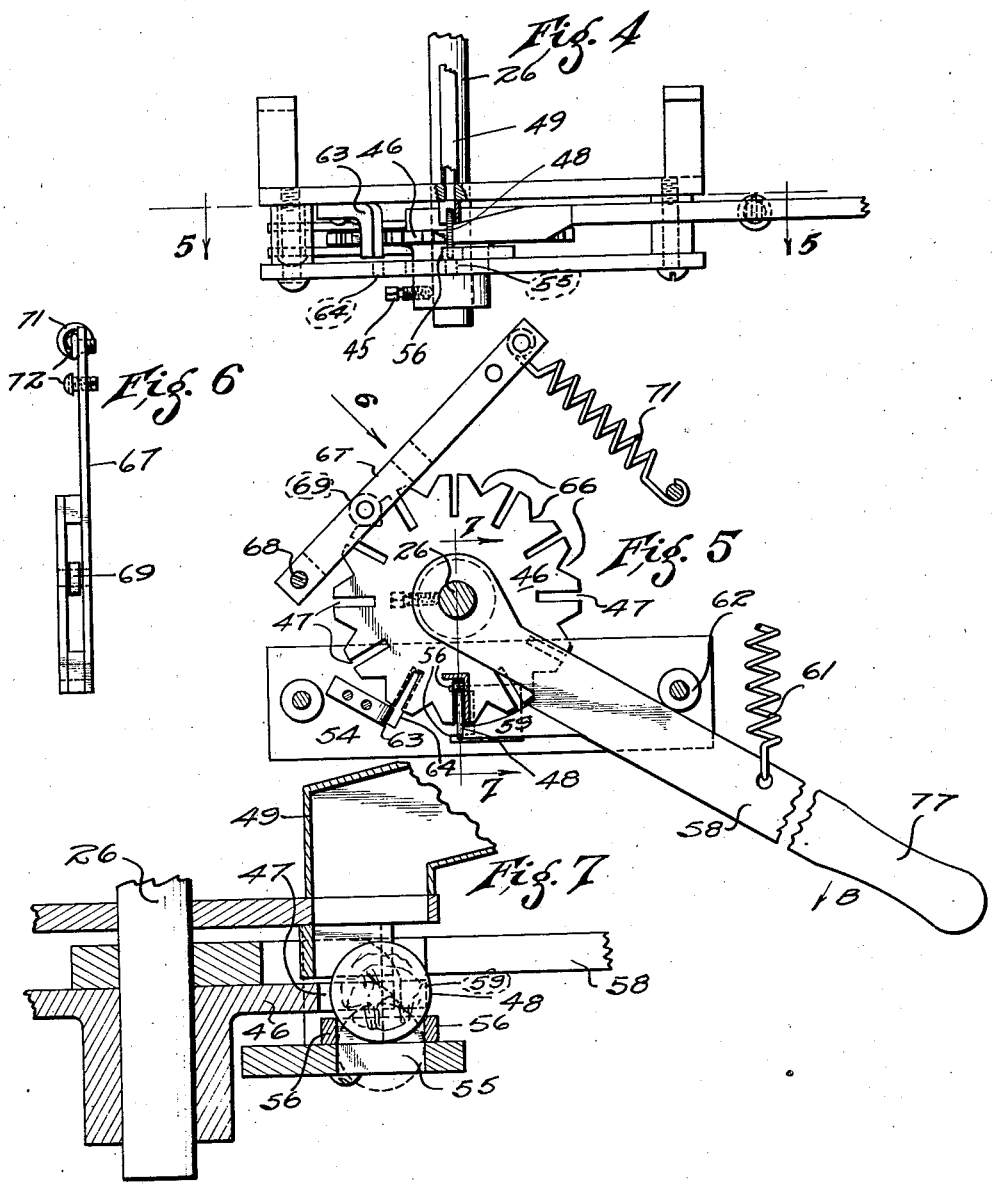

Patented Apr. 8, 1930

1,753,248

UNITED STATES PATENT OFFICE

HARRY G. NUTT, OF ALTADENA, CALIFORNIA, ASSIGNOR, BY MESNE ASSIGNMENTS, TO SELECTOR CORPORATION, OF SALT LAKE CITY, UTAH, A CORPORATION OF UTAH

FRUIT-VENDING APPARATUS

Application filed February 8, 1928. Serial No. 252,889.

This invention relates to coin controlled vending apparatus, and is particularly intended for the vending of oranges or other fruit.

The main object of the invention is to provide a vending apparatus having certain novel and advantageous features of construction and operation as hereinafter described.

A particular object of the invention is to provide an apparatus which handles the fruit without injury thereto and which provides a separate support for each fruit and preserves each fruit out of contact with other fruit at all times.

A further object of the invention is to provide an apparatus adapted to receive a considerable number of fruit and to operate in such manner as to cause the fruit to pass in succession through the apparatus and to be delivered thereby in sequence.

A further object of the invention is to provide a device in which all of the fruit is readily visible to any one desiring to procure a fruit therefrom, and in which the movements imparted to the fruit by the machine are also readily visible from the outside.

The apparatus comprises essentially a plurality of fixed supporting members disposed one above another, a plurality of fruit conveying devices defining fruit-receiving pockets or compartments above the respective supporting members and operable to move the fruit placed in said pockets around above the supporting members, each of said pockets having a bottom member or fruit carrying element hingedly secured to the fruit conveying device. All of the fruit conveying devices are operable simultaneously and each supporting member is provided with one opening disposed in such position that upon each operation of the fruit conveying devices one of the fruit receiving pockets is brought into position over said opening, each fruit carrying element being adapted to swing down to a substantially vertical position upon being moved over any such opening and thus release the fruit carried thereby, and such opening being of sufficient size to permit a fruit so released to pass therethrough into the corresponding pocket of the next lower fruit conveying device. The openings in the respective supporting members are arranged out of line with one another and the arrangement is preferably such that the openings in the successively higher supporting members are successively displaced, in the direction of movement of the conveying devices, by an angular distance equal to the angular distance between successive pockets. By means of such an arrangement, each pocket which has just been emptied of fruit due to being moved over one of said openings, is moved, at the next operation of the machine, into position beneath the opening in the next higher supporting member, so as to receive the fruit delivered therethrough upon such operation.

At each operation of the machine, therefore, one fruit is permitted to fall from each conveying device on to the next lower conveying device simultaneously. Beneath the opening in the lowermost supporting member is provided a fruit delivering means, so that the fruit passing through this opening at each operation is delivered in position to be taken by the person operating the machine. Upon repeated operation of the machine the entire supply of fruit is caused to move successively therethrough and to successively lower conveying devices and to be finally delivered in sequence through said delivery means. A particularly advantageous feature of this arrangement is that each fruit is separately supported at all times and the fruits are not allowed to rest upon one another or to come in contact with one another in any way, as in the case of other forms of vending machines. Furthermore, the fruits are carried around upon carrying members which move around with the conveying devices, as distinguished from any apparatus in which the fruits are pushed, rolled, or dragged around upon fixed shelves.

The accompanying drawings illustrate embodiments of my invention, and referring thereto:

Fig. 2 is a section on line 2—2 in Fig. 1, with fruit not shown.

Fig. 3 is a section on line 3—3 in Fig. 2.

Fig. 4 is a side elevation of the coin controlled operating mechanism, with the lower end of the coin chute broken away.

Fig. 5 is a plan view thereof on line 5—5 of Fig. 4.

Fig. 6 is a side elevation of the positioning arm shown in Fig. 5.

Fig. 7 is a partial section on line 7—7 in Fig. 5.

Fig. 8 is a partial view similar to Fig. 2, showing a modified form of impelling means.

Fig. 9 is a section on line 9—9 in Fig. 8, with the fruit shown in position.

Fig. 10 is a view similar to Fig. 8 of a further modification.

Fig. 11 is a section on line 11—11 in Fig. 10, with the fruit shown in position.

Figure 1:
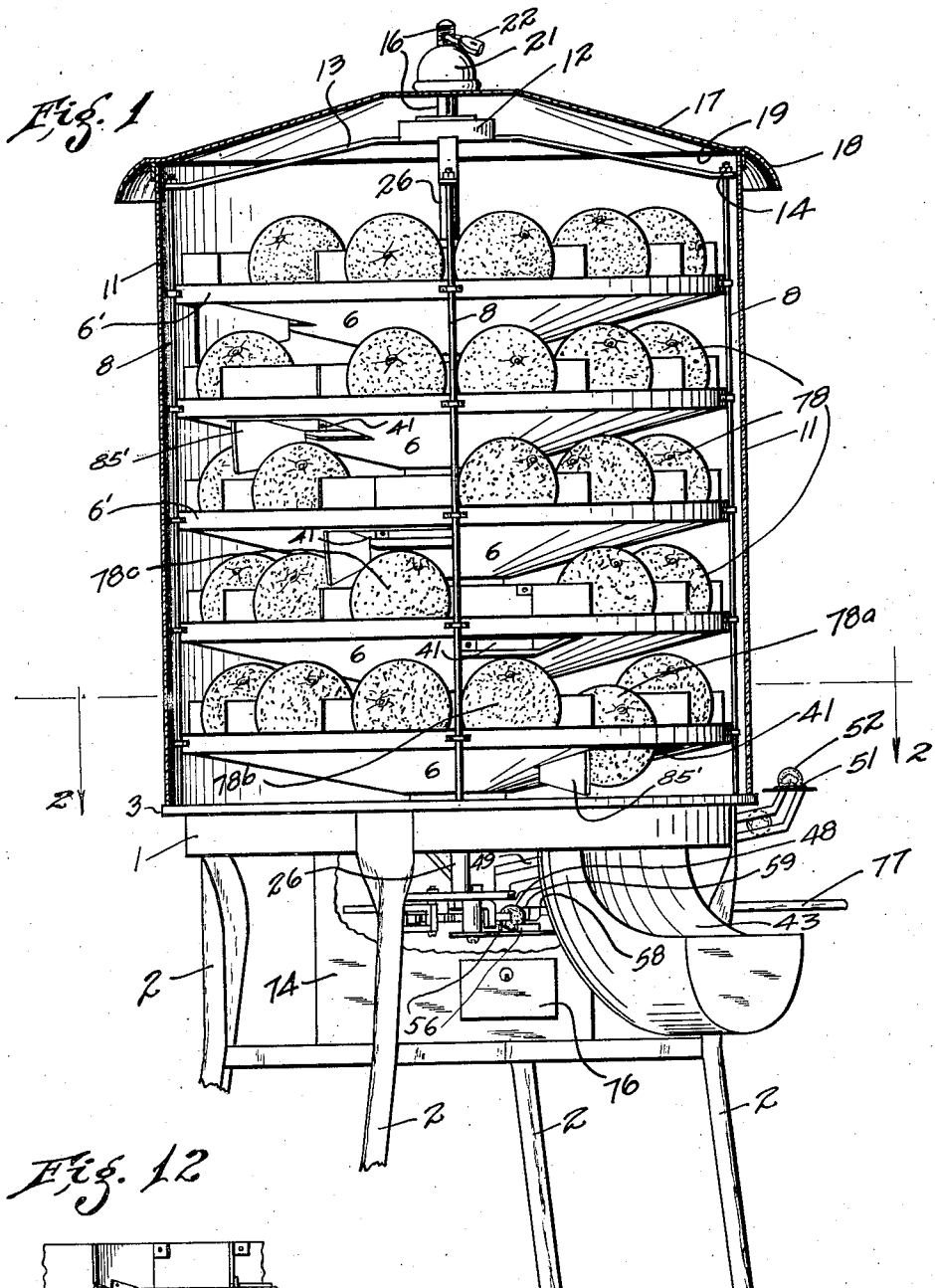
Fig. 1 is a side elevation of the apparatus, with the glass casing and cover shown in section.

The apparatus may comprise a base 1 mounted upon supporting legs 2 and provided at its outer edge with an upturned flange 3. Above said base are provided any desired number of supporting members 6, which may be formed as shelves or trays of inverted cone shape and having central openings 7. It is not essential that these supporting shelves be conical in shape, but I prefer to incline the same downwardly toward the center of the machine in order to assist in holding the fruit in proper position thereon. Each shelf is preferably provided with an upturned flange 6', to positively retain the fruit thereon. These shelves may be supported in fixed position by means of rods or frame members 8 secured to base 1, and said shelves are spaced apart sufficiently to permit a layer of fruit to be placed on each shelf. A cylindrical glass casing 11 may be provided around said shelves, said casing resting upon the base 1 just inside annular flange 3. An upper bearing means 12 may be mounted by means of arms 13 secured to the upper ends of rods 8 as at 14. A threaded bolt or lug 16 may extend upwardly from said upper bearing member and a cover plate 17 may be provided for closing the top of the apparatus, said cover plate being provided with a depending flange 18 engaging around the outside of the glass casing 11. A gasket 19 of rubber or other suitable yielding or resilient material is preferably provided between the cover plate and the upper end of casing 11 so as to provide a yielding pressure upon said casing. A retaining member 21 may be screwed on to the upper end of bolt 16 to hold the same in place and any suitable form of locking device 22 may be provided for preventing removal of said retaining member by any unauthorized person.

A vertical shaft 26 may be mounted for rotation in bearing means 27 on base 1, and in the upper bearing means 12 aforesaid, one or both of said bearing means being adapted to support the vertical thrust of said shaft, for example as shown in bearing 27 in Fig. 3. The respective conveying devices are mounted upon said shaft, each of said conveying devices being shown as comprising a wooden hub portion 29 and a plurality of impelling vanes 31 defining fruit-receiving pockets 32 above the respective supporting members 6. Said conveying devices may be secured to shaft 26 by means of collars 33 and set screw 34, so as to permit both vertical and rotative adjustment of said devices on said shaft. This permits the conveying devices to be disposed at any desired height above the respective supporting shelves. Each of said impelling vanes 31 may be tapered upwardly at the outer portion of its lower edge as shown at 36 so as to conform to the shape of the supporting member. Said vanes may be secured to hub portion 29 by cutting and bending over, in opposite directions, the upper and lower portions of their inner ends, to form oppositely extending flanges 35 and securing said flanges to said bent portions by screws 37. The inwardly projecting intermediate portions 38 of the inner ends of the vanes may be inserted in properly spaced saw-cuts or other slots 39 to assist in holding the vanes rigidly in position. A fruit carrying bottom member 85 may be hingedly secured as at 86 to the lower edge of each impelling vane 31, said fruit carrying members normally resting and sliding upon the supporting shelves 6.

Figure 12:
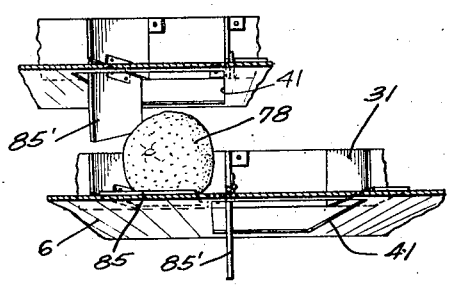
Fig. 12 is a section on line 12—12 in Fig. 2.

Each supporting shelf 6 is provided with one opening 41 of the approximate shape and size of the individual pockets or compartments 32 and sufficiently large to permit free passage therethrough of the largest fruit to be handled in the machine. The fruit carrying members 85 are of such size as to swing downwardly through the opening 41 in the corresponding shelf upon being moved over said opening, as shown for example at 85' in Figs. 1 and 12. In the apparatus shown the direction of rotation is as indicated by the arrow A in Fig. 2, so as to cause motion of the fruit shown in Fig. 1 in a direction from right to left, and the openings 41 in successively higher shelves are successively displaced, in the direction of such rotation by an angular distance equal to the distance between successive pockets 32, as clearly shown in Fig. 1. A fruit delivering chute 43 is provided beneath the opening 41 in the lowermost shelf, and extends to a position below the base 1 and outside the casing 11, so that any fruit passing through opening 41 is delivered by said chute to a position to be taken by the person operating the machine.

The operating mechanism for effecting rotation of the fruit impelling elements may comprise a disc 46 secured to shaft 26 in any suitable manner, as by means of set screw 45, and provided about its periphery with a plurality of notches 47 which are equal in number and in angular spacing to the vanes 31 aforesaid. Each of said notches is of sufficient width to receive a coin or check by which operation of the machine is to be controlled and is of less depth than the diameter of said coin or check, so that a coin dropped into one of said notches, as indicated at 48, will project out beyond the periphery of disc 46, as indicated in Fig. 7. A coin chute 49 is provided, having an opening 51 outside the casing, in which the coin may be inserted as shown at 52, and extending inwardly and downwardly to a position directly above one of the notches 47, the lower end of said chute being broken away in Fig. 4 in order to show the coin 48 in position in said notch.

A plate 54 is provided at such a distance below disc 46 that a coin resting thereon in vertical position will have its center substantially in line with the middle of said disc. Said plate may be provided with an opening 55 directly beneath the lower end of coin chute 49, of slightly less length than the diameter of the coin or check intended to operate the machine, so that a coin of smaller diameter will simply fall through said opening and hence be ineffective in operating the machine. For example, the device may be intended for operation by means of a nickel, and opening 55 may be of such length as to permit a penny to fall therethrough. In order to prevent the coin of proper denomination from entering part way into the opening 55, two lugs 56 may be provided extending upwardly from the ends of said opening in position to engage the sides of said coin and hold the same out of said opening as shown in Fig. 7, until it has been moved out of line therewith as hereinafter described.

An operating lever 58 is loosely mounted upon shaft 26 and is provided with an arm 59 adapted to engage a coin deposited in the position indicated at 48. A tension spring 61 may be provided tending to hold said lever against a stop 62. Another stop 63 may be provided in position to be engaged by the coin upon rotation of the device from the position shown in Fig. 5 through the angular distance between successive fruit receiving pockets, and plate 54 is provided with another opening 64 directly beneath the position occupied by the coin at the time of engagement with said stop, said opening being of sufficient size to permit the coin to fall therethrough.

Disc 46 is also provided with a plurality of centering or positioning notches 66, which may be V-shaped as shown and are equally spaced between the notches 47 aforesaid. A positioning arm 67 is pivotally mounted at 68 and is provided with a positioning roller 69 rotatably mounted thereon and adapted to engage in any one of the notches 66 so as to accurately position one of the notches 47 below the lower end of coin chute 49. A tension spring 71 is provided tending to draw the roller 69 into the notches 66, and arm 67 may be provided with a plurality of lugs or pins 72, the spring 71 being securable to any one of said lugs, so as to provide for adjustment of the inward pressure exerted by said spring on the roller 69.

A suitable housing 74 may be secured beneath the base 1 so as to enclose the operating mechanism above described and a lock controlled receptacle 76 may be provided for receiving the coins falling through the openings 55 and 64 aforesaid. The operating lever 58 may extend through a suitable slot (not shown) in the housing 74 and may be provided with a handle 77 at its outer end for manual operation thereof.

In the operation of the apparatus the several fruit receiving pockets or compartments 32 are first filled with fruit, such as oranges, as indicated at 78, the glass casing 11 and cover plate 17 being removed for this purpose by unlocking lock 22 and unscrewing retaining member 21. One fruit is placed in each of said pockets with the exception of those directly above the openings 41 in the respective supporting members. The glass casing and cover plate may then be replaced and held in position by means of retaining member 21 and lock 22.

If a coin is now delivered through chute 49 to the position indicated at 48, it will be held in this position by means of lugs 56. Operation of lever 58 in the direction indicated by the arrow B in Fig. 5 will cause arm 59 to engage the projecting portion of such coin and rotate the disc 46. It will be apparent that unless there is a coin in this position, operation of lever 58 will have no effect upon the disc 46, as the arm 59 will in that case simply pass freely around the periphery of said disc. During this operation the coin passes out of engagement with lugs 56, but is normally still held in position in the notch 47 due to the lateral pressure of arm 59 thereon. However, even if the pressure of said arm should be removed by releasing lever 58, the coin would still be supported and held in this position by means of plate 54. The disc 46 may thus be rotated until the coin engages stop member 63 and if the pressure on lever 58 is then released the coin will fall through opening 64 into the receptacle 76.

Rotation of said disc in this manner operates through shaft 26 to cause a corresponding rotation of the several fruit conveying devices above described, and in such rotation the impelling vanes 31 thereon engage the respective fruits and move the same around above the supporting members or shelves 6, each fruit being carried by one of the carrying members 85 during such movement. The extent of such rotation effected by one operation corresponds to the angular spacing between successive pockets, so that fruit receiving pocket of each conveying device will be brought into position over the opening 41 in the corresponding shelf, and the fruits thus brought into these positions will be permitted to fall through said openings substantially simultaneously due to the carrying members 85 swinging down into the positions indicated at 85', those from the upper conveying devices falling into the corresponding pockets of the next lower conveying devices and that from the lowermost conveying device being directed through chute 43 into position to be taken by the person operating the machine. For instance, in Fig. 1 the fruit 78$^b$ has just fallen through the opening 47 in the second shelf, the fruit 78$^c$ has just fallen through the opening in the next shelf and so on, while the fruit 78$^a$ is shown, for the purpose of illustration, as just falling through the opening in the lowermost shelf. It will be understood, however, that in actual operation said fruit 78$^a$ will normally have already fallen into the chute 43 simultaneously with the dropping of the fruits 78$^b$, 78$^c$, etc. onto the respective shelves.

It will be apparent that an empty pocket is provided on each shelf to receive the fruit falling thereon from the shelf above, because of the relative arrangement of openings in the successive shelves. For example, the pocket above the lowermost shelf, which has just been emptied of the fruit 78$^a$ will, upon the next operation of the machine, be moved into position beneath the opening in the second shelf, and so on. Furthermore, the carrying elements which have swung downwardly to permit the fruits to fall through the respective openings will be raised again by engagement with the further edge of said openings, so as to receive and carry the fruit deposited thereon in the next operation. It will also be noted that at the end of each operation another coin receiving notch 47 on disc 46 is brought into position to receive a coin for effecting the next operation.

A particular advantage of the above construction is that, by providing the fruit conveying means with the hinged carrying members 85, each fruit is caused to be carried around upon one of said members, instead of being rolled around upon the supporting shelf 6 therebeneath, as would be the case if the fruit carrying members were omitted and the fruit allowed to rest directly on the shelves. Such shelves thus serve merely as fixed supports or guides for the fruit carrying members, instead of as actual runways over which the fruit is rolled. A further advantage is obtained by inclining the supporting shelves 6 and supporting members 85 downwardly toward the center of the apparatus, as this causes the fruit to be held inwardly by gravity, and counteracts the tendency of the impelling elements 31 to move the fruit forward in straight lines and thus crowd the same toward the outside edge of the supporting means. Both of these features of my invention contribute to hold each fruit in fixed position relative to the fruit conveying means as it is carried around thereby, thus substantially eliminating rubbing or bruising of the fruit, and maintaining the same in the best possible condition until delivered by the apparatus.

It will be understood that many modifications may be made in the parts of the above apparatus, without departing from the spirit of the invention.

The cylindrical casing 11 may be of any other suitable transparent material instead of glass, or may of course be non-transparent, although I prefer to provide a transparent casing in order to permit the fruit therein to be viewed by a prospective purchaser and to also permit the purchaser to watch the operation of the machine and the manner in which the fruit is handled therein.

In the form of apparatus above described the impelling vanes 31 are shown as extending vertically, but it may in some cases be advantageous to incline such vanes upwardly and rearwardly with respect to the direction of motion thereof, as shown for example at 31$^a$ in Figs. 8 and 9, so as to exert a slight lifting, as well as impelling, action on the fruit, the respective vanes being provided as before with hinged carrying elements 85$^a$ for the fruits.

Another modification is shown in Figs. 10 and 11, in which each of the impelling vanes is replaced by two projecting pins 31$^b$, which are at such levels as to engage the fruit respectively above and below the center thereof, as in Fig. 11. The lower of the two pins may advantageously be placed slightly in advance of the upper one, so that said pins constitute in effect an impelling member inclined upwardly and rearwardly with respect to the rotation thereof, in the same manner as the inclined vanes shown in Figs. 9 and 10. A fruit carrying element 85$^b$ may also be hingedly mounted upon each lower pin 31$^b$.

I claim:

1. In an apparatus for vending fruit, a plurality of fixed supporting members disposed one above another and inclined downwardly toward the center thereof, and a plurality of fruit conveying devices each provided with a plurality of impelling elements defining fruit-receiving compartments above the respective supporting members and operable to move fruit placed in said compartments around above said supporting members, each of said supporting members being provided with one opening of sufficient size to permit passage of a fruit therethrough, said conveying devices being adapted to permit fruit so moved over one of said openings to fall therethrough, and said openings in successively higher supporting members being successively displaced, in the direction of movement of the impelling elements, by an angular distance equal to the angular distance between successive compartments of said fruit impelling elements.

2. A fruit vending apparatus comprising a plurality of circular shelves mounted one above another and each inclined downwardly toward the center, a vertical shaft extending upwardly and centrally within said shelves, a plurality of fruit-conveying devices corresponding to said shelves and mounted upon said shaft, each of said fruit conveying devices being provided with a plurality of impelling vanes defining fruit-receiving pockets above the respective shelves and carrying members hingedly secured to said vanes and resting upon the shelf beneath, and each shelf having an opening beneath one of said pockets of sufficient size to permit a carrying member moved thereover to swing downwardly and release of fruit carried thereby and to also permit the fruit so released to fall therethrough, said openings in successively higher shelves being disposed beneath successive pockets in the direction of rotation of said shaft, means for rotating said shaft so as to bring said pockets in succession over the respective openings, means tending to so position said shaft as to bring one of said pockets directly over each of said openings, and fruit delivering means beneath the opening in the lowermost shelf.

3. An apparatus for vending fruit comprising a plurality of fixed supporting members mounted one above another, fruit conveying means mounted for rotation about a vertical axis and provided with a plurality of fruit impelling members above each fixed supporting member and fruit carrying members hingedly mounted on said impelling members and normally resting upon the supporting member therebeneath, each of said fixed supporting members having an opening of sufficient size to permit each fruit carrying member to swing downwardly upon being moved thereover so as to allow a fruit carried thereby to fall through said opening, and said openings being arranged in staggered relation in successive supporting members, means for rotating said fruit conveying means, fruit delivering means in position beneath the opening in the lowermost fixed supporting member, and a casing of transparent material enclosing said fixed supporting members and fruit conveying means.

4. In an apparatus for vending fruit, in combination with a fixed supporting member, a fruit conveying device for moving fruit placed thereon around above said supporting member, said conveying device comprising a hub portion and a plurality of impelling vanes projecting radially therefrom, each of said vanes having the upper and lower portions of its inner end cut and bent in opposite directions to form oppositely extending flanges while leaving an inwardly projecting portion therebetween, means securing said flanges to said hub portion, and said inwardly projecting portion engaging in a notch in said hub portion to assist in holding the vane in position.

5. In an apparatus for vending fruit, a base, frame members extending upwardly from said base, a plurality of shelves secured to said frame members one above another and each inclined downwardly toward the center, an upwardly extending flange at the outer edge of each of said shelves, a rotatably mounted shaft extending vertically and centrally through said shelves, and a plurality of fruit conveying devices mounted upon said shaft and above the respective shelves, each of said shelves being provided with an opening of sufficient size to permit passage of fruit therethrough and said openings being arranged in staggered relation in successive shelves.

6. An apparatus as set forth in claim 5, each of said fruit conveying devices having a plurality of fruit impelling members but being substantially free from means obstructing the view of fruit placed thereon, and said upwardly extending flanges on the shelves terminating materially below the center of such fruit so as to permit substantially free view of said fruit.

7. An apparatus for vending fruit comprising a plurality of fixed supporting members disposed one above another, a vertical shaft extending centrally of said supporting members, and a plurality of fruit conveying devices mounted on said shaft and above the respective supporting members, each of said conveying devices being provided with a plurality of fruit impelling members and with fruit carrying members hingedly secured to the respective impelling members and normally resting upon the supporting member therebeneath throughout substantially a complete rotative movement of the fruit carrying members around above the respective supporting members, and each supporting member being provided at one point in the path of movement of said fruit carrying members with an unobstructed opening of sufficient size to permit any fruit carrying member to swing downwardly upon being moved over said opening and allow a fruit carried thereby to fall through said opening.

8. In an apparatus for vending fruit, a plurality of supporting members disposed one above another and provided with respectively staggered openings of sufficient size to permit passage of fruit therethrough, and a plurality of rotatably mounted fruit conveying devices above the respective supporting members, each of said fruit conveying devices having a plurality of fruit impelling members operable to move fruit around upon said supporting members and into position above the respective openings therein, said fruit impelling members being inclined upwardly and rearwardly with respect to the rotation of said conveying devices.

In testimony whereof I have hereunto subscribed my name this 26th day of January, 1928.

HARRY G. NUTT.